United States Patent
Downing

(10) Patent No.: US 10,044,244 B2
(45) Date of Patent: Aug. 7, 2018

(54) DOWNHOLE BLADELESS GENERATOR

(71) Applicant: Halliburton Energy Services, Inc., Houston, TX (US)

(72) Inventor: Andrew James Downing, Bakersfield, CA (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/443,315

(22) PCT Filed: Dec. 28, 2012

(86) PCT No.: PCT/US2012/072099
§ 371 (c)(1),
(2) Date: May 15, 2015

(87) PCT Pub. No.: WO2014/105053
PCT Pub. Date: Jul. 3, 2014

(65) Prior Publication Data
US 2015/0303771 A1 Oct. 22, 2015

(51) Int. Cl.
*H02K 7/18* (2006.01)
*E21B 41/00* (2006.01)

(52) U.S. Cl.
CPC ....... *H02K 7/1823* (2013.01); *E21B 41/0085* (2013.01)

(58) Field of Classification Search
CPC ....... Y02E 10/28; Y02E 10/725; F03B 13/00; E21B 31/06; E21B 23/00; E21B 34/066;
(Continued)

(56) References Cited

U.S. PATENT DOCUMENTS 1,061,142 A   5/1913   Tesla
6,224,325 B1  5/2001   Conrad et al.
(Continued)

FOREIGN PATENT DOCUMENTS

WO   WO 2003/081038 A1   10/2003
WO   WO 2007/094685 A1   8/2007
WO   WO 2010109169 A2 *  9/2010  ............. A61L 29/06

OTHER PUBLICATIONS

International Search Report and The Written Opinion of the International Searching Authority, or the Declaration, Mar. 18, 2013, PCT/US2012/072099, 10 pages, ISA/US.
(Continued)

*Primary Examiner* — Viet Nguyen
*Assistant Examiner* — Charles Reid, Jr.

(57) ABSTRACT

Disclosed embodiments include a bladeless generator carried by drilling string and disposed to employ mud flow through the drill string or return flow along the exterior of the drill string to drive the bladeless generator utilizing the boundary layer effect of fluid flow across a plurality of disks to generate electricity. The bladeless generator can be spaced apart from the primary flow path so as not to significantly disrupt flow therethrough. A portion of the primary flow path is diverted with flow channels or apertures to direct the diverted portion of the flow tangentially across a portion of the edges of the disks. The bladeless generator can be utilized to power electric downhole equipment, such as monitoring equipment or directional drilling steering equipment.

21 Claims, 5 Drawing Sheets

(58) Field of Classification Search
CPC .......... E21B 7/20; E21B 10/322; E21B 10/43;
E21B 41/0085; H02K 7/1823
USPC ......... 290/43, 54; 166/66.5, 65.1, 248, 66.4;
175/57, 320, 107, 93
See application file for complete search history.

(56) References Cited

U.S. PATENT DOCUMENTS

| | | | | |
|---|---|---|---|---|
| 6,503,067 | B2* | 1/2003 | Palumbo | F01D 1/36 |
| | | | | 415/202 |
| 6,672,409 | B1* | 1/2004 | Dock | E21B 7/046 |
| | | | | 166/66.5 |
| 6,726,443 | B2* | 4/2004 | Collins | F01D 1/34 |
| | | | | 415/90 |
| 7,165,608 | B2* | 1/2007 | Schultz | E21B 41/0085 |
| | | | | 166/66.5 |
| 7,192,244 | B2 | 3/2007 | Grande, III et al. | |
| 7,246,660 | B2* | 7/2007 | Fripp | E21B 41/0085 |
| | | | | 166/65.1 |
| 7,434,634 | B1* | 10/2008 | Hall | E21B 10/62 |
| | | | | 166/65.1 |
| 8,033,328 | B2 | 10/2011 | Hall et al. | |
| 2003/0010652 | A1* | 1/2003 | Hunt | F24J 3/081 |
| | | | | 205/742 |
| 2005/0001735 | A1* | 1/2005 | Hall | E21B 47/01 |
| | | | | 340/853.7 |
| 2006/0260797 | A1* | 11/2006 | Hall | E21B 17/028 |
| | | | | 166/65.1 |
| 2007/0194948 | A1* | 8/2007 | Hall | E21B 17/003 |
| | | | | 340/854.8 |
| 2010/0018703 | A1* | 1/2010 | Lovell | E21B 47/123 |
| | | | | 166/255.2 |
| 2010/0129193 | A1* | 5/2010 | Sherrer | F03B 3/18 |
| | | | | 415/1 |
| 2011/0164958 | A1* | 7/2011 | Saitoh | F01D 1/026 |
| | | | | 415/1 |

OTHER PUBLICATIONS

Telsa Turbine. Wikipedia: The Free Encyclopedia. http://en.wikipedia.org/wik/Tesla_turbine.
Russian Office Action issued for RU 2015125593/03(039843) dated Nov. 16, 2016.
Supplementary European Search Report issued for EP 12891096 dated Sep. 22, 2016.

* cited by examiner

DOWNHOLE BLADELESS GENERATOR

The present application is a U.S. National Stage patent application of International Patent Application No. PCT/US2012/072099, filed on Dec. 28, 2012, the benefit of which is claimed and the disclosure of which is incorporated herein by reference in its entirety.

FIELD OF THE DISCLOSURE

The present disclosure relates to equipment and techniques for generating power downhole in a wellbore during drilling. More particularly, this disclosure provides a downhole generator that employs a plurality of rotatable disks vertically arranged relative to the drilling fluid flow through a drill string which are utilized to drive generators for the production of electricity.

DESCRIPTION OF THE RELATED ART

Many downhole tools utilized in drilling require electrical power for operation, including sensor tools, measurement-while-drilling (MWD) tools, rotary steerable tools, etc. In the past, the most common source for supplying electrical power to such tools were either batteries locally positioned along the drill string or integrated with the tool, or alternatively, electrical lines extending down from the earth's surface. Batteries with the capacity necessary for such downhole operations are typically large, and therefore, undesirable because of space constraints downhole. Moreover, many batteries cannot operate for an extended period of time at downhole temperatures and pressures as demanded by many operations. Electrical lines extending from the surface can interfere with drilling fluid flow or access if they are positioned within a tubing string, and such electrical lines can be damaged if they are positioned inside or outside of the tubing string.

As an alternative to batteries or electrical lines, various types of downhole power generators have been devised for supplying power to one or more downhole tools. Many of these downhole generators use fluid power, i.e. drilling mud, transmitted from the surface to the bottom hole assembly to rotate a rotor disposed within the drillsting annulus. Working in conjunction with a stator, the system drives the shaft of a generator to produce electricity. The fluid flow then continues on through the annulus.

One drawback to such a generator is the need to maintain a certain mud pressure in order to drive the rotor. Another drawback to such a system is that it interferes with the drilling fluid flow through the drillstring's main annulus. Additionally, such systems experience cavitation when gas is entrained in the liquid. Moreover, mixed variable flow regimes, i.e., gas and liquid, can reduce performance or require modified gearing for the rotor. Finally, such systems are very intolerant to abrasive fluids or fluids with high solid content.

Thus, it would be desirable to provide a downhole generator that can be operated regardless of the flow regime with minimal impact on performance. Moreover, it would be desirable to provide a downhole generator that likewise, will have minimal impact on the primary flow of drilling fluid through the drillstring.

DETAILED DESCRIPTION OF PREFERRED EMBODIMENTS

Figure 1:
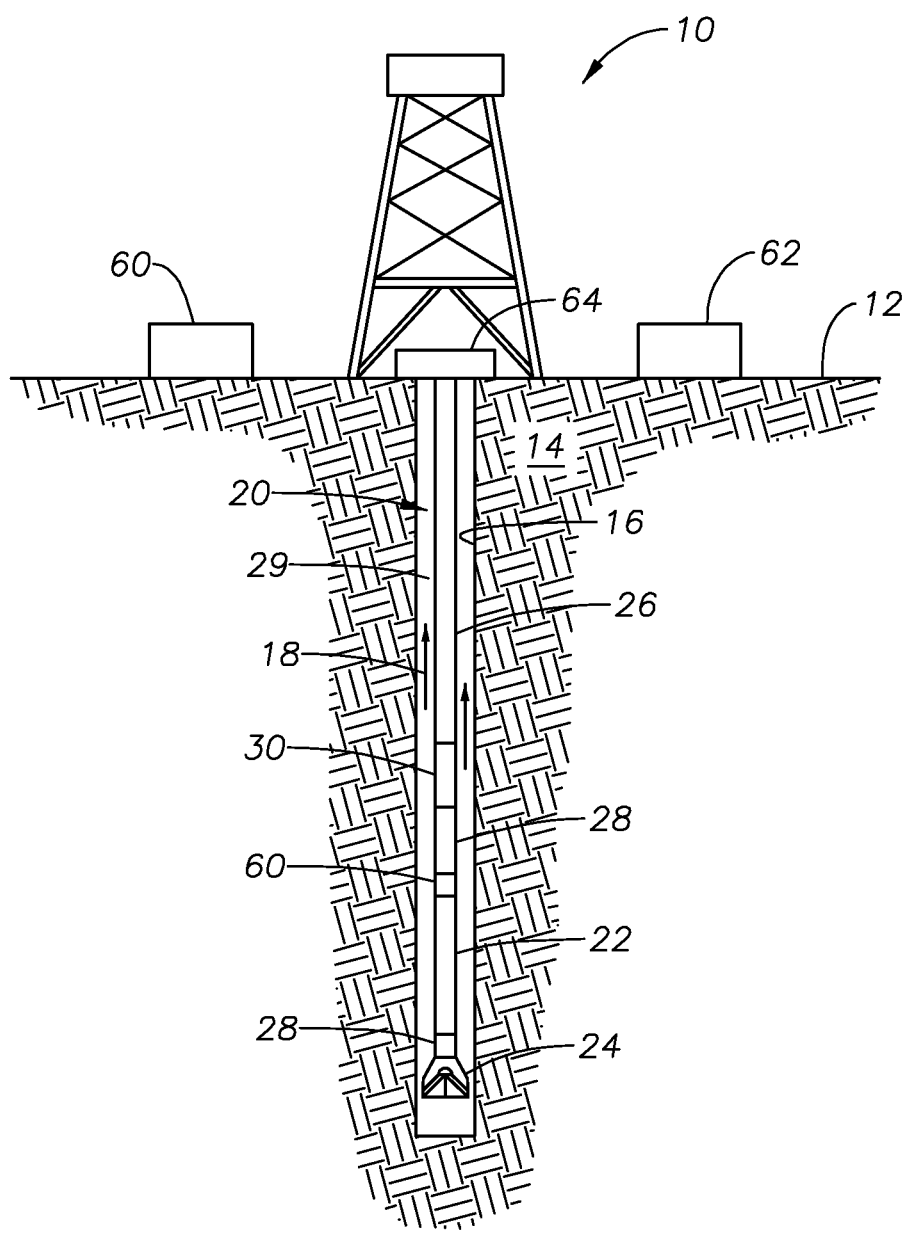
FIG. 1 illustrates a drilling platform with a drill string carrying a bladeless generator.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole" and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

With reference to FIG. 1, there is shown a drilling rig 10 generally positioned at the surface 12 of a formation 14. A wellbore 16 extends into a formation 14 from the surface 12. A drill string 20 extends down from drilling rig 10 and into wellbore 16. The drill string 20 generally includes a bottom hole assembly ("BHA") 22 and a drill bit 24 carried by a plurality of pipe or drill collar sections 26. Drill string 20 may include other tools or instruments 28 utilized during drilling, such as sensor tools, measurement-while-drilling (MWD) tools, rotary steerable tools and the like. Return wellbore fluid 18 is disposed within the annulus 29 formed between formation 14 and drill string 20.

Figure 2:
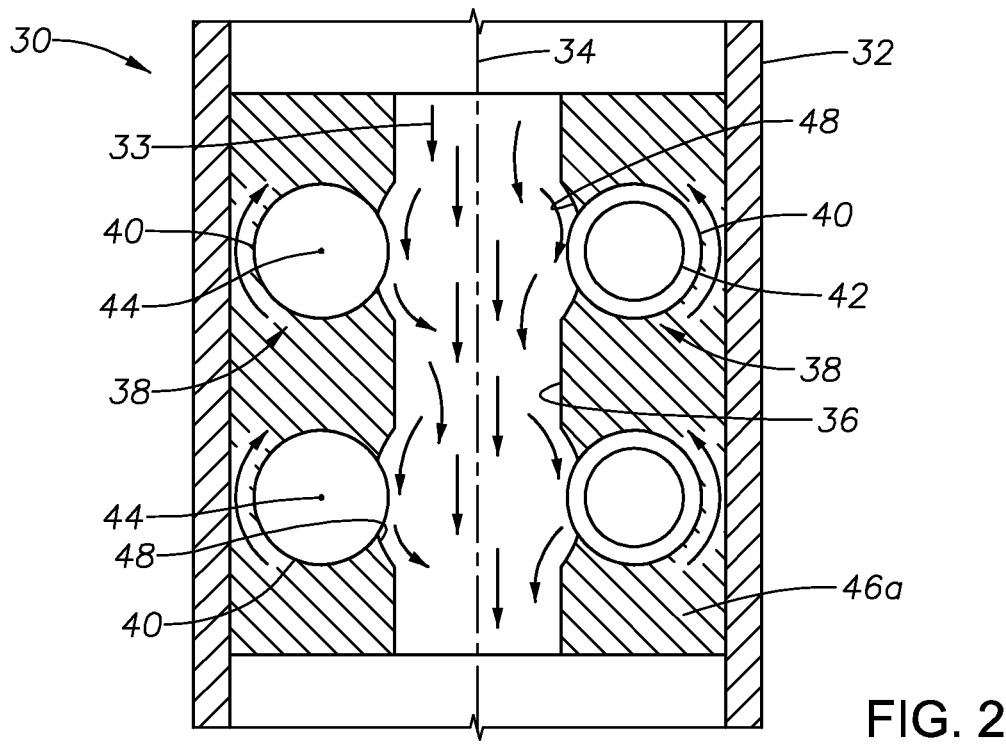
FIG. 2 illustrates a cut-away side view of two bladeless generators disposed along the internal fluid flow path of a drill string.

With reference to FIG. 2, a cross-sectional view of one embodiment of a downhole electric generator system 30 of the disclosure is illustrated. System 30 generally includes a pipe collar or sub housing 32 defined along an elongated axis 34 with a main bore 36 formed within pipe collar 32. Flow lines 33 are provided to illustrate the general direction of flow of drilling mud as it passes through system 30 when system 30 is disposed along a drill string 20. Positioned within pipe collar 32 are one or more tesla turbines or bladeless generators 38. Each bladeless generator 38 includes one, and preferably a plurality of rotatable generator disks 40 and at least one generator coil and magnet system 42. Disks 40 are mounted on a drive shaft 43 (see FIGS. 3 and 4) disposed along an axis 44 that is preferably perpendicular to the elongated axis 34 so that each disk mounted on drive shaft 43 is vertically oriented to enhance performance of the system. Although such an orientation is preferable, it will be understood that disks 40 may have any orientation relative to axis 34 so long as a portion of the flow 33 is directed across the disk 40 as described below.

More specifically, persons of ordinary skill in the art will appreciate that bladeless generators 38 as described herein are centripetal flow turbines that utilizes the boundary layer effect of fluid flow across the perimeter edge of a plurality of disks 40. As fluid drags across the surface of the disks 40, the disks 40 rotate the drive shaft 43 of generator 38. The rotational energy is provided by the surface layer effect as opposed to fluid impinging on blades or veins as is taught in prior art downhole generators. Fluid flow spiraling towards the center of the disks 40 can be exhausted back into the drilling fluid flow stream utilizing and exhaust system, such as apertures 52 as discussed below and shown in FIG. 6. Disks 40 are preferably smooth across their surface to minimize surface and shear losses. Moreover, disks are preferably thin to minimize drag and turbulence at disk edges. Disk 40 diameters may be selected based on the confines of the system in which the bladeless generators 38 are utilized. In certain embodiments, the diameters of disks 40 are no more than the standard outer diameter dimension of drill pipe common in the industry, namely 2 ⅜" OD-6 ⅝" OD. Of course, larger diameter disks may be utilized in fluid flow systems with larger diameter pipe or casing. Thus, the bladeless generators of the disclosure are positioned along a fluid flow system of a wellbore to generate electricity for use by electrical equipment utilized in association with the wellbore.

In any event, the bladeless generator 38 is mounted on a support structure 46 so that a portion of the flow 33 within bore 36 passes across the perimeter edge of disks 40. Thus, disks 40 may simply be mounted on support structure 46 so as to partially extend into bore 36 a sufficient distance that a portion of the flow therethrough passes across the outer edges of the disks 40. In this regard, a disk may be characterized as having a surface area and in certain embodiments, no more than one half of the surface area of the disk extends into the bore, and preferably only a lesser portion of the surface area of the disk extends into the bore as desired to optimize the spiraling flow of fluid across the surface of the disk characteristic of the boundary layer effect. In an embodiment illustrated in FIG. 2, support structure 46 may be an insert 46a disposed to mount within the bore 36 of a pipe collar 32. Support structure 46 may include one or more flow diversion mechanisms or structures, such as flow channels 48, generally disposed to direct a portion of the drilling fluid flow 33 across a portion of the disks 40. In this regard, bladeless generators 38 may have any orientation with respect to axis 34 so long as flow channels are correspondingly disposed to divert a portion of the flow 33 from main bore 36 and direct the diverted portion of the flow 33 across disks 40 as described herein.

Figure 3:
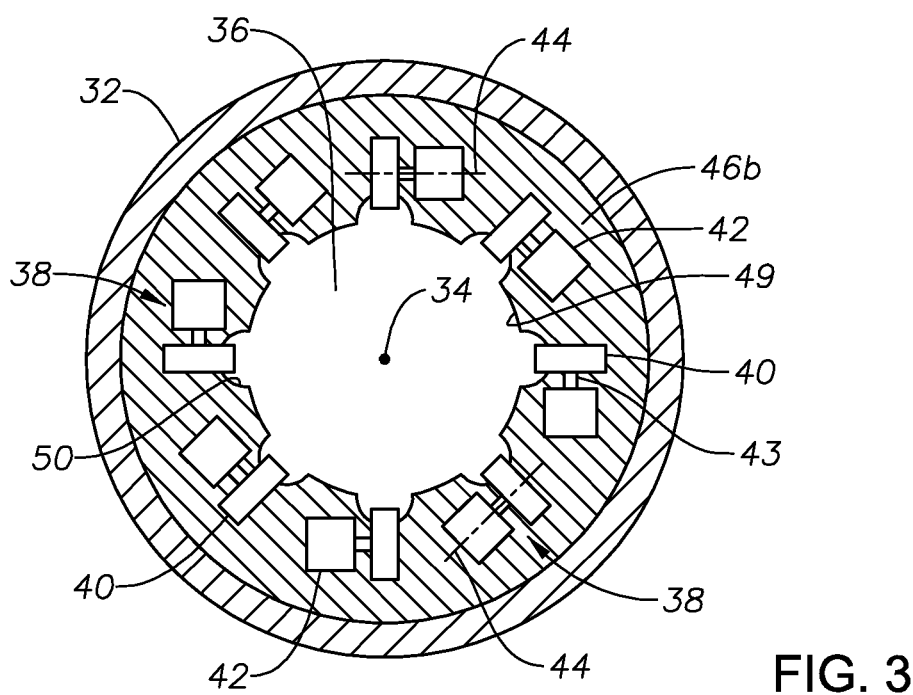
FIG. 3 illustrates a cut-away axial view of a plurality of bladeless generators disposed along the internal fluid flow path of a drill string.

In another embodiment as best seen in FIG. 3, support structure 46 may be a plate 46b mounted within pipe collar 32. The plate may include a first aperture 49 generally disposed to allow flow along the bore 36 to pass therethrough and a second aperture 50 functioning as a flow diversion mechanism or structure and disposed in plate 46b to direct at least a portion of drilling fluid flow 33 across a portion of the disks 40 mounted on plate 46b. In certain embodiments, aperture 50 may be selectively operable to adjust flow therethrough. Aperture 50 may be fully open when a certain level of power generation is required, closed when power generation is not required, or partially opened to adjust power generation.

With continued reference to FIG. 3, although support structure 46 may support only a single bladeless generator 38, in certain preferred embodiments, support structure 46 may support a plurality of bladeless generators 38. Although not limited to a particular arrangement, as illustrated in FIG. 3, the plurality of bladeless generators are radially spaced about axis 34, preferably in a symmetrical arrangement. In FIG. 3, eight bladeless generators are illustrated, although more or fewer may be used depending upon, among other things, power generation requirements and space constraints.

As discussed above, while bladeless generators 38 are primarily described as oriented so that disks 40 are generally radially oriented about axis 34 as is illustrated in FIG. 3, certain embodiments of the disclosure are not limited to a particular orientation of generators 38. For example, the bladeless generators of 38 may be oriented so that disks 40 are tangentially arranged on a radius about axis 34. In such case, an aperture 50, flow channel 48 or similar structures may be utilized to divert a portion of flow 33 from bore 36 to rotate disks 40.

Furthermore, in certain embodiments, at least two, bladeless generators 38 may be axially spaced along drill collar 32, such as is illustrated in FIG. 2.

When bladeless generators 38 are axially spaced, two or more support structures 46 axially spaced apart may likewise be utilized. In this regard, each axially spaced support structure 46 may also support a plurality of bladeless generators 38.

Figure 4:
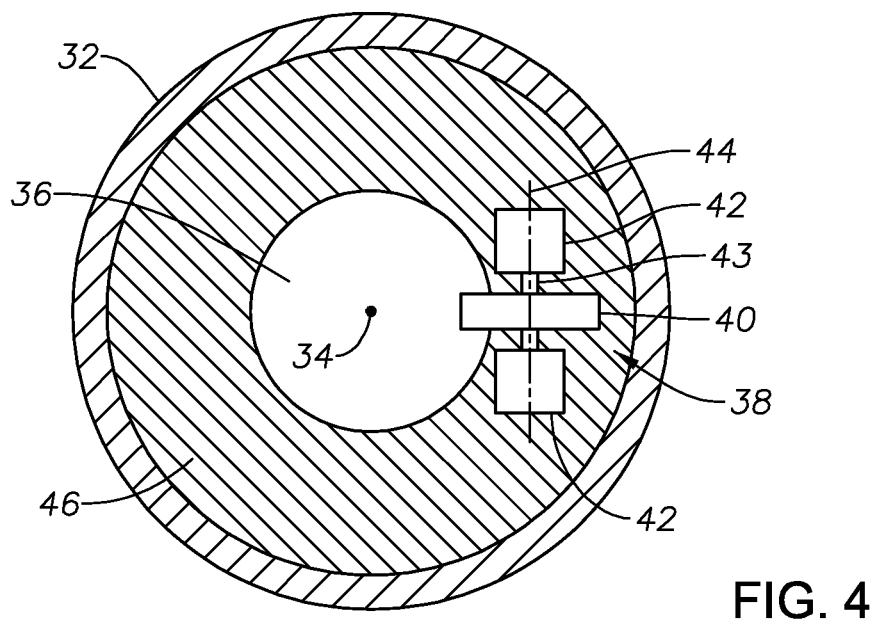
FIG. 4 illustrates a cut-away axial view of a single bladeless generator disposed along the internal fluid flow path of a drill string.

In another embodiment, as best seen in FIG. 4, bladeless generator 38 may simply be mounted on support structure 46 so that at least a portion of the disks 40 extend into the main flow bore 36.

Figure 5:
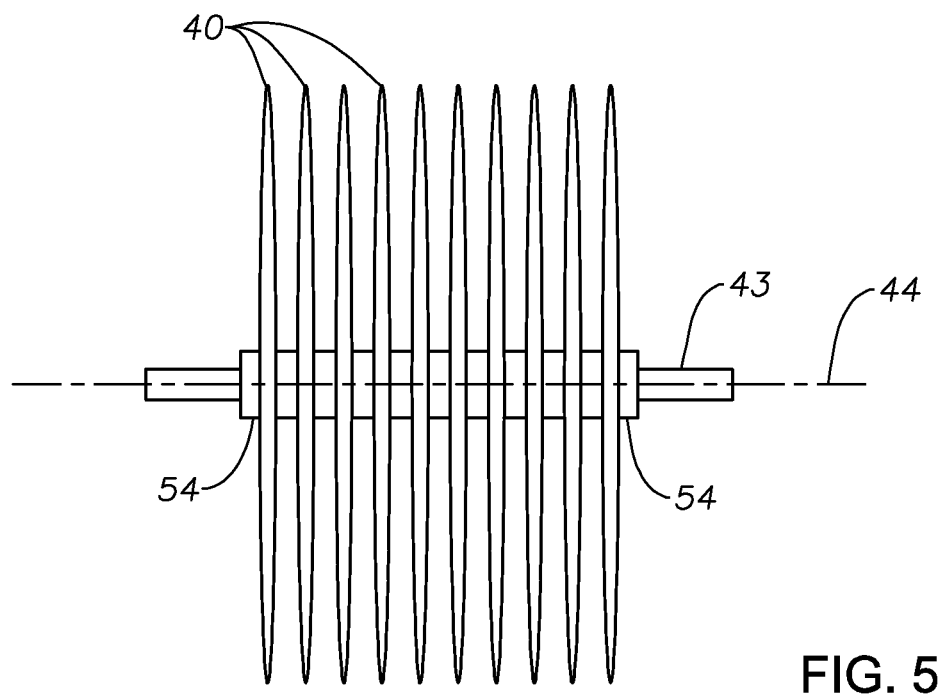
FIG. 5 illustrates a plurality of disks utilized in one embodiment of a bladeless generator.
Figure 6:
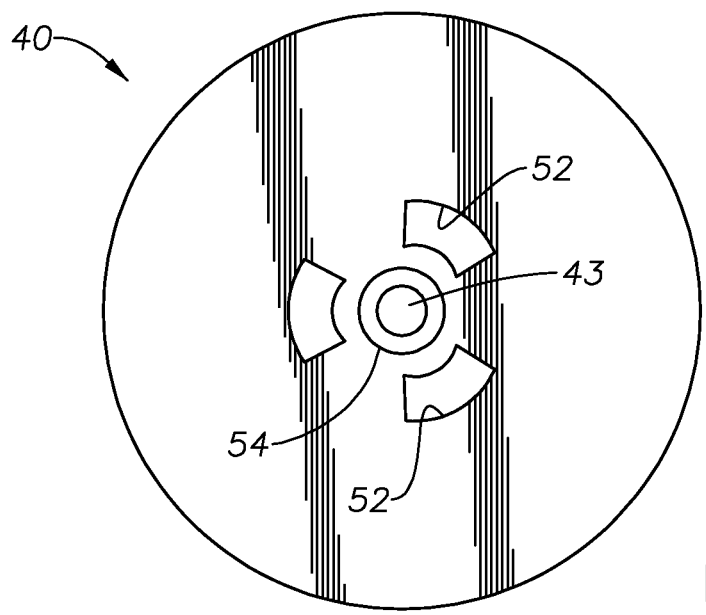
FIG. 6 illustrates a side view of one embodiment of a disk utilized in embodiments of a bladeless generator.

FIG. 5 illustrates a set of disks 40 disposed on axis 44, while FIG. 6 illustrates a side view of a disk 40. In certain preferred embodiments, disks 40 may include one or more apertures 52 disposed therethrough to allow fluid to flow between disks. Such apertures 52 may also be used to exhaust flow on the disks 40 back to main bore 36. Each disk may include a hub or spacer 54 so as to adjust the spacing between adjacent disks.

Although the various embodiments of the system 30 above have been described as being internally positioned within a drill collar in order to utilized drilling fluid flow along bore 36 to drive disks 40, in other embodiments of the disclosure, bladeless generators 38 may be carried by a drill collar 32 so as to utilize return flow in the wellbore annulus 29 to drive disks 40. In this case, the fluid flow system is the cased or uncased wellbore and utilizes fluid flow up the wellbore to drive the bladeless generators.

Figure 7:
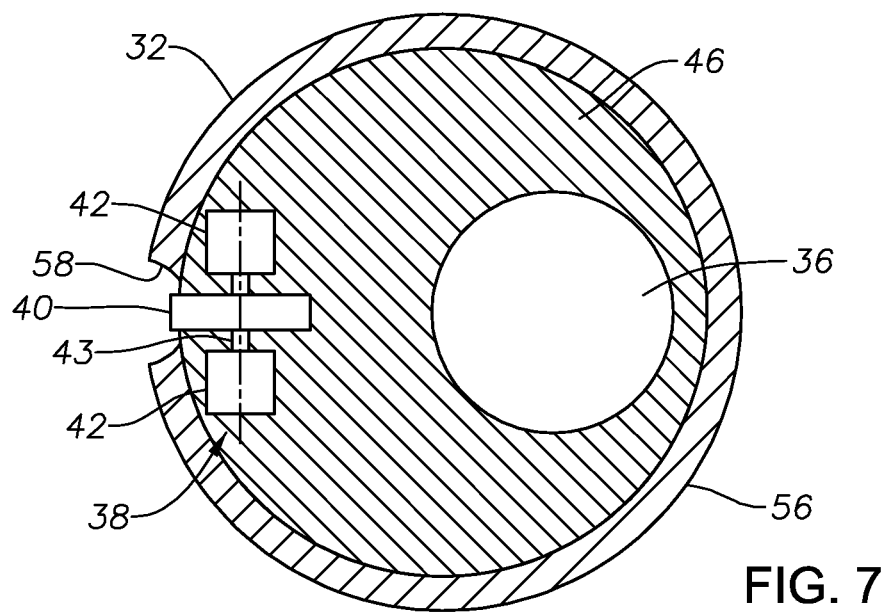
FIG. 7 illustrates a cut-away axial view of a single bladeless generator disposed along a flow path external to a drill string.

Thus, in one embodiment of the disclosure, as illustrated in FIG. 7, disks 40 are carried by pipe collar 32 so as to intersect with the return flow of drilling fluid passing across the exterior surface 56 of pipe collar 32. In such case, disks 40 may extend out into the flow stream or alternatively, may include a channel 58 to direct a portion of the return flow stream across disks 40. Bore 36 may be co-axial with pipe collar 32 or may be offset as shown so as to permit additional space within pipe collar 32 to position bladeless generators 38.

While pipe collar 32 has been described with reference to a drill string, pipe collar 32 may be a housing or sub disposed to support one or more bladeless generators 38 for use in production wellbores or other piping associated with transmission of fluids. Such a system may include an arrangement such as illustrated in FIG. 7, but without an enclosed internal annulus. For example, channel 58 may be arranged to direct a portion of the flow up a cased or uncased production wellbore through flow passages passing through the housing and back out into the production flow stream. The housing may be supported and lowered into a producing wellbore on any elongated support structure extending into the wellbore, such as a wireline, slickline, pipeline, umbilical cord, coiled tubing, pipe string or cable. The housing may include other equipment, such as an energy storage system. Likewise, in order to generate electricity in remote locations, bladeless generators may be positioned generally within the axial flow path of fluids utilized during drilling or recovery or transmission of hydrocarbons. For example, bladeless generators may be positioned along the drilling fluid supply lines of a drilling fluid supply system 62 at the surface. In another embodiment, system 30 may be positioned at a wellhead to drive monitoring electronics utilized in producing wellbores. In another embodiment, system 30 may be positioned in remote transmission lines and utilized to drive monitoring electronics in such remote locations. In such case, a hydrocarbon distribution system may comprise a pipeline, with electrically operated monitoring equipment disposed to monitor the pipeline and a bladeless generator disposed to generate electricity to operate the monitoring equipment. In another embodiment, system 30 may be incorporated as part of a blowout preventer ("BOP") 64 and utilized as a source of power for various BOP functions.

In any event, as generator 38 generates electricity, the electricity can be stored locally to the system 30 in an energy storage system 60 (see FIG. 1 as a non-limiting example) such as batteries, capacitors, or the like.

Figure 8:
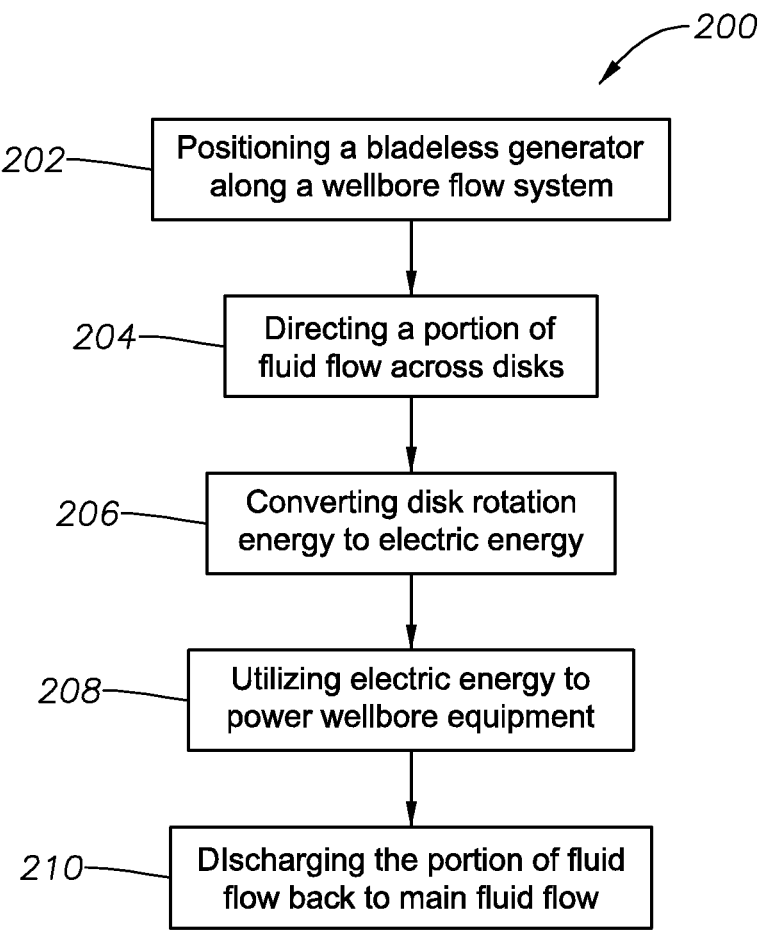
FIG. 8 illustrates a flow-chart of one embodiment of a method of generating downhole electricity utilizing the bladeless generators of the invention.

With the foregoing system in mind and referencing FIG. 8, a method 200 for practicing the system of the disclosure includes a step 202 of deploying a bladeless generator within a wellbore or otherwise deploying the bladeless generator along a fluid flow path associated with the wellbore. In step 204, a portion of the fluid flow is directed across one or more disks of the bladeless generator. This may be accomplished by positioning the bladeless generator so that at least a portion of the disks extend into a main fluid flow stream or otherwise, by diverting a portion of the main fluid flow stream across the disks. In step 206, the boundary layer effect of fluid flow across the disks cause rotation of the disks. This rotational energy drives a drive shaft permitting the coils and magnets of a generator to convert the rotational energy to electric energy. Thereafter, in step 208, the generated electricity can be utilized to power tools or instruments or other electric equipment associated with the wellbore, such as monitoring electronics disposed in the wellbore. In step 210, the diverted portion of the main fluid flow can then be exhausted back into the main fluid flow stream. The fluid flow stream can be the drilling mud utilized to drill a wellbore, the return drilling mud passing up an annulus, production hydrocarbons in a producing wellbore or other flow stream, such as a drilling fluid injection stream or hydrocarbon distribution stream, utilized in association with the wellbore. The electricity may be stored at the surface or locally within the wellbore and utilized as needed.

By utilizing surface layer effect, the foregoing generators 38 are more tolerant than prior art downhole generators to fluids that are abrasive, viscous or contain solids. Moreover, the system of the disclosure is able to generate power, without modification, regardless of the liquid or gas composition of the motive fluid. As such, the system is particularly suited for operating in both overbalanced and underbalanced drilling environments, regardless of whether the fluid is mud, foam or gas.

The discs of the generators 38 can also be mounted so as to have little or no impact on the flow through the main bore during drilling procedures. This results in a "thru-bore" design by providing for substantially unobstructed drilling fluid flow through the length of the tool. Persons of ordinary skill in the art will appreciate that this is particularly desirable if fishing operations are required during drilling procedures.

Finally, if the bladeless generators are disposed in remote locations, such as the sea-floor, elimination of the blades/vanes of the prior art devices will increase reliability over the prior art. More specifically, blades/vanes of the prior art are prone to wear when subjected to abrasive fluids, thereby diminishing generator efficiency. The use of discs in a bladeless generator are much less prone to wear, thereby reducing maintenance frequency and costs.

It will be appreciated to those skilled in the art having the benefit of this disclosure that the method and apparatus described herein is believed to provide systems and methods utilizing continuous variable transmissions for use in drilling and other applications. Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the system and method of the disclosure. It is to be understood that the forms of the disclosure shown and described herein are to be taken as the presently preferred embodiments. Elements and materials may be substituted for those illustrated and described herein, parts and processes may be reversed, and certain features of the disclosure may be utilized independently, all as would be apparent to one skilled in the art after having the benefit of this description of the disclosure. Changes may be made in the elements described herein without departing from the spirit and scope of the disclosure as described in the following claims.

I claim:

1. A downhole electric generator system comprising:
   an elongated tubular housing with an elongated axis, the housing having an exterior surface and further defining a main bore extending generally parallel to the axis through the tubular housing between opposing longitudinal ends thereof; and
   a bladeless generator carried by the housing, the bladeless generator comprising at least one disk mounted on a drive shaft, the disk having a perimeter;
   wherein the disk intersects the main bore tangentially at the perimeter of the disk and the perimeter of the main bore such that no more than one half of the surface area of the disk extends into the main bore.

2. The downhole electric generator system of claim 1, wherein the main bore is internally disposed within the tubular housing along the axis, wherein the main bore defines a portion of a fluid flow path and the bladeless generator is carried by the housing so that the drive shaft is spaced apart from the elongated axis.

3. The downhole electric generator system of claim 2, further comprising a flow channel defining a portion of the fluid flow path, the flow channel in fluid communication with the main bore so as to divert a portion of flow passing through the main bore, the flow channel disposed to tangentially intersect the perimeter of the disk.

4. The downhole electric generator system of claim 1, wherein a fluid flow path is along the exterior surface of the tubular housing and the bladeless generator is carried by the housing so that a portion of the disk extends beyond the exterior surface of the housing.

5. The downhole electric generator system of claim 1, further comprising a plurality of disks mounted on the drive shaft.

6. The downhole electric generator system of claim 1, wherein the elongated tubular housing is a sub carried by a drill string.

7. The downhole electric generator system of claim 1, wherein the elongated tubular housing is a sub carried by a wireline.

8. The downhole electric generator system of claim 1, further comprising at least two bladeless generators carried by the housing, wherein the disks of each bladeless generator intersects the main bore tangentially at the perimeter of the disk.

9. The downhole electric generator system of claim 8, wherein the bladeless generators are spaced apart radially from one another about the main bore.

10. The downhole electric generator system of claim 8, wherein the bladeless generators are spaced apart axially from one another along the main bore.

11. The downhole electric generator system of claim 1, further comprising a support structure on which the bladeless generator is mounted, wherein the support structure is mounted to the housing.

12. The downhole electric generator system of claim 11, wherein the support structure comprises a flow diversion mechanism to divert a portion of the flow and direct the diverted flow across the disk of the bladeless generator.

13. The downhole electric generator system of claim 1, further comprising an energy storage system carried by the elongated tubular housing.

14. The downhole electric generator system of claim 1, wherein the disk is oriented on an axis which is transverse to that of the fluid flow path.

15. A wellbore system for use with a wellbore extending into a formation, the system comprising:

a fluid flow system having a main bore extending through the fluid flow system between opposing longitudinal ends thereof and generally along an axis defined by the fluid flow system;

electric equipment for use in association with the wellbore;

a bladeless generator having a disk that intersects the main bore such that no more than one half of the surface area of the disk extends into the main bore to thereby generate electricity to power the electric equipment.

16. The wellbore system of claim 15, wherein the fluid flow system is a drill string.

17. The wellbore system of claim 15, wherein the fluid flow system is a wellbore casing.

18. The wellbore system of claim 15, wherein the fluid flow system is a drilling mud delivery system.

19. A method for generating electricity by a wellbore system, the method comprising the steps of positioning a bladeless generator along a main bore of a fluid flow system in a wellbore, the main bore extending through the fluid flow system between opposing longitudinal ends thereof and generally along an axis defined by the fluid flow system;

causing at least a portion of fluid flowing in the main bore of the fluid flow system to pass across a disk of the bladeless generator, the disk being positioned to intersect the main bore such that no more than one half of the surface area of the a disk of the bladeless generator extends into the main bore;

utilizing a boundary layer effect of fluid flow across the disk to generate electricity.

20. The method of claim 19, further comprising a step of operating electric wellbore equipment utilizing the bladeless generator.

21. The method of claim 19, wherein the step of causing at least a portion of fluid flowing in the fluid flow system to pass across a disk of the bladeless generator is accomplished by diverting a portion of flow from a main flow path, directing the diverted portion across the disk, and thereafter, discharging the diverted portion back into the main flow path.

* * * * *